June 30, 1964

L. N. JACOB 3,139,328

INDICATOR PAPER

Filed July 21, 1960

Fig. 1

Before Exposure

Colorless

| A | B | C | D | E | F | G | H | I | J | K | L |
|---|---|---|---|---|---|---|---|---|---|---|---|
| 1.0 | 2.0 | 2.8 | 4.0 | 5.4 | 6.6 | 7.0 | 8.2 | 9.4 | 10.8 | 11.6 | 12.0 |

Colored ⎯⎯⎯⎯⎯ Colorless

After Exposure to pH 10

Fig. 2

Before Exposure

Colored ⎯⎯⎯⎯⎯ Colorless

| A | B | C | D | E | F | G | H | I | J | K | L |
|---|---|---|---|---|---|---|---|---|---|---|---|
| 1.0 | 2.0 | 2.8 | 4.0 | 5.4 | 6.6 | 7.0 | 8.2 | 9.4 | 10.8 | 11.6 | 12.0 |

Colored ⎯⎯⎯⎯⎯ Colorless

After Exposure to pH 5

Fig. 3

Before Exposure

Yellow

| A | B | C | D | E |
|---|---|---|---|---|
| 3.0 | 3.8 | 4.6 | 5.2 | 5.6 |

Other Colors ⎯⎯⎯ Yellow

After Exposure to pH 4

Before Exposure

Blue to Purple

Fig. 4

| A | B | C | D |
|---|---|---|---|
| 3.0 | 3.8 | 4.4 | 5.2 |

Blue to Purple ⎯⎯ Yellow to Red

After Exposure to pH 4

INVENTOR.
LAWRENCE N. JACOB

BY Robert O. Spindle

ATTORNEY

United States Patent Office 3,139,328
Patented June 30, 1964

3,139,328
INDICATOR PAPER
Lawrence N. Jacob, Toledo, Ohio, assignor to Sun Oil Company, Philadelphia, Pa., a corporation of New Jersey
Filed July 21, 1960, Ser. No. 44,379
9 Claims. (Cl. 23—253)

This invention relates to paper suitable for indicating the pH of a medium containing hydrogen ions.

The paper according to the invention is capable of providing a rapid and accurate determination of the portion of the total pH range, 0 to 14, within which the pH of the medium lies. The determination is colorimetric and may be done either visually or by suitable color sensing and recording devices. Automatic control of pH may be provided by suitable combinations of color-sensing means and means for adjusting pH, as by addition of acidic or basic material.

The paper according to the invention indicates not merely whether the medium to be measured is above or below a given pH, but also within which portion of the total pH range it falls. This is accomplished without necessity for comparison of shades of color with standard color charts, thereby obviating errors arising from changes in the color chart with age or from individual variations in vision, partial or total color blindness, etc.

The indicator paper according to the invention is impregnated with a plurality of indicators. Each indicator is in a different section of the paper, and each is adapted to undergo a color change in a different part of the pH range. The indicators are arranged in order of increasing pH at which the color change takes place.

After subjection to the medium whose pH is to be measured, the indicators in some of the sections of the paper are above the pH at which the change in indicator color takes place, and some are below the pH at which the change takes place. The natures of the indicators and their arrangement is such that the colors of the first-named sections are distinguishable as a whole from the colors of the other sections, and the paper exhibits two portions which are readily distinguished from each other by the prevailing color states of the sections thereof.

In a preferred embodiment, the paper after subjection to the medium exhibits one portion which shows the natural color of the paper, e.g. white, the indicators in that portion being colorless, and a second portion which contains sections that are colored as a result of the indicators being colored. The particular natures of the colors in the sections of the second portion are not critical, the fact that the sections are colored rather than white being sufficient to distinguish the two portions of the paper.

The portion of the pH range in which the medium falls is determined by observation, after subjection to the medium, of the respective locations on the paper of the two portions. Suitable legends are provided on the paper for determining, from those locations, the pH range of the medium. These legends may be printed on the paper, or may appear as a result of color change in the indicator after subjection to the medium to be measured, or may be provided in any other suitable manner.

The particular arrangement of sections on the paper is not critical. Any arrangement which permits ready location of the boundary between the two portions of the paper after subjection to the medium, and which permits the pH to be determined, from that location, by observation of the legends in the sections on either side of that boundary, is satisfactory.

The indicator paper according to the invention permits location of pH of the medium tested within a range between characteristic pH values for the color changes of the indicators in adjacent sections of the paper. The indicators are chosen to provide the necessary accuracy of determination, the accuracy increasing with increasing closeness to each other of the characteristic pH values for the indicators in adjacent sections. A person skilled in the art can make the appropriate selection for a given needed accuracy, in the light of the present specification.

To prepare the paper according to the invention, solutions of the indicators are prepared, e.g. in water, alcohol, etc. Each section of the paper is then impregnated with a separate indicator solution. This is done by brushing, spraying, or any other suitable procedure which will limit the individual solution to the appropriate section of the paper. Following impregnation, the paper is dried by suitable known procedure, and may be given other appropriate treatment as known in the art of making indicator paper.

To measure pH, the indicator paper is subjected to the medium to be measured so that all sections of the paper come in contact with the medium. Immersion or other suitable known procedure can be employed. The paper according to the invention is generally suitable for use in those media in which prior art indicator papers have been employed.

The following examples illustrate the invention.

*Example I*

An indicator paper as illustrated in FIGURE 1 is prepared. The vertical dashed lines on the piece of paper indicate divisions between the various sections of the paper, each section being impregnated with a solution of a different indicator. The indicators are symbolized by the letters from A through L. The number shown in each section of the paper is a legend representing the pH as which, as the pH rises, the indicator in that section of the paper undergoes a characteristic color change, from colorless to colored. Thus indicator A changes from colorless to colored as the pH rises above 1, indicator B changes from colorless to colored as the pH rises above 2, etc.

The following table shows the indicators which are employed in the present example, and also shows the color at which the indicator changes upon a rise in pH above the level set forth in the table.

| Indicator | Change at pH | From Colorless to— |
|---|---|---|
| A. Quinaldine Red | 1.0 | Red. |
| B. Eosin Yellowish | 2.0 | Yellow. |
| C. 2, 4-dinitrophenol | 2.8 | Yellow. |
| D. Ethyl Red | 4.0 | Red. |
| E. p-nitrophenol | 5.4 | Yellow. |
| F. Quinoline blue (cyanine) | 6.6 | Blue. |
| G. 1-naphthol | 7.0 | Blue green. |
| H. o-cresolphthalein | 8.2 | Red. |
| I. Thymolphthalein | 9.4 | Blue. |
| J. Picrylnitromethylamine | 10.8 | Brown. |
| K. 2, 4, 6-trinitrotoluene | 11.6 | Orange. |
| L. 1, 3, 5-trinitrobenzene | 12.0 | Orange. |

The various sections of the paper are impregnated with solutions of the various indicators which solutions are at sufficiently low pH that the indicator is in the colorless condition. This is accomplished by suitable adjustment of the pH, e.g. by addition of hydrochloric acid, to bring about the colorless pH state. As an example, indicator A is dissolved, e.g. in 1% concentration, in ethanol, and hydrochloric acid is added. The appropriate section of the indicator paper is impregnated with the solution, and excess water is evaporated. As a result of the acidity of the solution, the section of the paper, following such evaporation, is not colored by the indicator, the latter being in the colorless condition. Thus, where white paper is employed, the section containing indicator A appears white.

Similar procedure is employed with the other indicators which are colorless at sufficiently low pH but undergo a change to a colored condition beginning at some pH in the range below 7. For those indicators which are colorless at pH of 7 or below, the use of an aqueous or other solution without addition of acid, the pH of the solution being approximately 7, can suitably be used to provide sections of the paper which are not colored by the indicator.

The preceding discussion refers to the initial preparation of the indicator paper, prior to exposure to a given medium in order to determine the pH range of that medium. Upon exposure to such medium, e.g. an aqueous liquid, the exposure being for example by immersion in the aqueous liquid, certain sections of the paper become colored as a result of the color change of the indicators in those sections, while other sections remain colorless, since the pH of the medium is below that at which the color change of the indicator takes place.

As illustrated in FIGURE 1, the paper is subjected to a medium which has a pH of 10, and sections A through I of the paper undergo the color changes characteristic of the indicators in those sections, to produce the colors which are set forth in the preceding table. Sections J, K, and L remain colorless.

By visual observation of the division between the colored and colorless sections of the paper, it is readily determined that the pH of the medium is within the range from 9.4 to 10.8. In a typical embodiment, the numbers as shown in the drawing are printed on the paper in the indicated positions, and the observer determines the pH range of the medium from the facts that if a given section is colored, the pH of the medium is above the number printed in that section, and that if the section is colorless, the pH is at or below the number printed in that section.

It is also within the scope of the invention to impregnate the various sections of the paper with the indicators in a pattern such that the color change of the indicator causes the number shown in FIGURE 1 to appear, against a white background for example, in the appropriate section, whereas the number was previously invisible. Thus, for example, in the case previously supposed of a medium having pH 10, each of the numbers shown in the sections A through I appears following exposure to the medium, whereas the numbers shown for sections J, K, and L remain invisible.

The observation of pH range by the procedure described herein is quite rapid and does not require any comparison with color standards which have been previously prepared on a chart separate from the indicator paper. With the indicator paper of the invention, comparisons with color charts are not necessary, and accurate determination of pH range is obtained simply by observation of a readily visible division between portions of the paper which exhibit one color classification and other portions which exhibit another color classification. Preferably one of the portions is colorless, while the other is colored, since this provides a readily determinable line of division.

Within the pH range determined as previously described, a further estimation of the actual pH can be made by observation of the strength of the color which is exhibited by the colored section of the paper nearest to the division between the colored and colorless sections. In FIGURE 1, a relatively strong blue color in section I indicates a pH closer to 10.8 than to 9.4, whereas a relatively weak blue color in that section indicates a pH closer to 9.4 than to 10.8.

*Example II*

The indicator paper illustrated in this example is impregnated with the same series of indicators employed in FIGURE 1. However, in the case of the paper of FIGURE 2, the solutions used to impregnate the various sections of the paper all have pH of about 7. Consequently the sections of the paper containing indicators A through F are colored, prior to exposure to the medium whose pH is to be measured. Thus the section containing indicator A has the characteristic red color of that indicator, and the section containing indicator F has the characteristic blue color of that indicator, etc. Since the indicators G through L are colorless at pH of 7, the sections of the paper containing these indicators are initially not colored.

Upon exposure of the paper to medium having pH of 5, the indicators E and F undergo the characteristic color change from colored to colorless as the pH is reduced from 7 to 5. Therefore, following the exposure, the sections containing the indicators E and F, in addition to those containing the indicators G through L, are not colored by the respective indicators, while the sections containing the indicators A through D remain colored. Visual observation of the division between the colored and colorless sections indicates that the pH of the medium is in the range from 4.0 to 5.4. A strong red coloration in the section containing indicator D shows that the pH is closer to 5.4 than to 4.0, whereas a weak coloration indicates that the pH is closer to 4.0 than to 5.4.

Upon exposure to a medium having pH of 10 for example, the paper illustrated in FIGURE 2 would be colored in sections A through I, whereas the sections containing indicators J, K, and L would remain colorless.

*Example III*

In FIGURE 3, indicator paper is illustrated wherein there are five sections each impregnated with a different indicator, as shown in the following table:

|  | pH | From Yellow to— |
|---|---|---|
| A. Bromophenol blue | 3.0 | Blue. |
| B. Bromocresol green | 3.8 | Blue. |
| C. Sodium 3-alizarin sulfonate | 4.6 | Red. |
| D. Bromocresol purple | 5.2 | Purple. |
| E. Alizarin | 5.6 | Red. |

Each of the indicators undergoes a characteristic color change from yellow to another color as indicated in the table, upon a rise in pH above the level set forth for each indicator in the table. Acidic solutions are employed in the impregnation so that the paper is yellow in each section prior to exposure to the medium whose pH is to be determined.

After exposure, for example, to a medium having pH of 4, the sections impregnated with indicators A and B are both blue, since the indicators in those sections have undergone their characteristic color change from yellow to blue. The sections impregnated with indicators C, D, and E remain yellow since the pH of the medium is below that at which the characteristic color change of those indicators takes place. Observation of the intensity of color in the section containing indicator B provides an indication of the location of the pH of the medium within the range from 3.8 to 4.6.

In this example, the color change in each indicator is from a first color, yellow, to another color, which may vary from one indicator to another, but which in each case is readily distinguishable from the first color.

*Example IV*

In FIGURE 4, indicator paper is illustrated containing four sections each impregnated with a different indicator, as shown in the following table:

|  | pH | From— | To— |
|---|---|---|---|
| A. Bromophenol blue | 3.0 | Yellow | Blue. |
| B. Resazurin | 3.8 | Orange | Violet. |
| C. Lacmoid | 4.4 | Red | Blue. |
| D. Bromocresol purple | 5.2 | Yellow | Purple. |

Solutions having pH for example of about 7 are employed in the preparation of the paper, so that the various sections exhibit their characteristic blue, violet and purple colors respectively. After exposure to a medium having pH for example of 4, the sections containing the indicators C and D change color and become red and yellow respectively, indicating a pH below the number shown in each section. Observation of the division between the sections exhibiting blue to purple color and those exhibiting yellow to red color shows that the pH of the medium is in the range from 3.8 to 4.4. A strongly violet color in the section containing indicator B shows a pH which is closer to 4.4 than to 3.8, whereas a weaker violet color in that section shows a pH which is closer to 3.8 than to 4.4.

In this example, the color change in each indicator is from a first color, which may differ from one indicator to another, to a second color which may also differ from one indicator to another. The first colors belong, however, to a class of colors, e.g. the yellow-orange-red portion of the spectrum, which is readily distinguishable from the class of colors, e.g. the violet-indigo-blue portion of the spectrum, to which the second colors belong.

The indicators referred to in the preceding example are known pH indicators. They may be applied to the paper in dilute, e.g. 0.01 to 1.0%, aqueous or methanol solutions, etc., as known in the art.

The invention claimed is:

1. Paper for indicating pH which comprises paper impregnated with a plurality of indicators, each in a different section of the paper and each adapted to undergo a color change from colorless to colored in a different part of the pH range, the indicators being arranged in order of increasing pH at which such change takes place, whereby upon exposure of the paper to a medium having a given pH, the paper has one portion composed of sections containing the indicators which change color at a pH below said given pH, and another portion composed of sections containing the indicators which change color at a pH above said given pH, the location of the visible boundary between the portions of the paper indicating the pH of the medium.

2. Indicator paper according to claim 1 wherein the color change in each indicator is from colorless to colored with increasing pH, and wherein, after exposure of the paper to said medium, the first-named portion of the paper is colored, and the last-named portion of the paper exhibits the natural color of the paper.

3. Indicator paper according to claim 1 wherein, prior to exposure to said medium, each indicator is at pH below that at which it undergoes color change.

4. Indicator paper according to claim 3 wherein, prior to exposure to said medium, all sections of the paper exhibit the natural color of the paper, each indicator being colorless.

5. Indicator paper according to claim 1 wherein, prior to exposure to said medium, some of the indicators are at pH below that at which they undergo color change, and the remaining indicators are at pH above that at which they undergo color change.

6. Indicator paper according to claim 1 wherein, prior to exposure to said medium, each indicator is at pH above that at which it undergoes color change.

7. Paper for indicating pH which comprises paper impregnated with a plurality of indicators, each in a different section of the paper and each adapted to undergo a color change from a first color to a second color in a different part of the pH range, the first color of each of said indicators being in a first portion of the spectrum and the second color of each of said indicators being in a second portion of the spectrum which is separate and distinct from said first portion of the spectrum, the indicators being arranged in order of increasing pH at which such change takes place, whereby upon exposure of the paper to a medium having a given pH, the paper has one portion composed of sections containing the indicators which change color at a pH below said given pH, and another portion composed of sections containing the indicators which change color at a pH above said given pH, the location of the visible boundary between the portions of the paper indicating the pH of the medium.

8. Indicator paper according to claim 7 wherein said first color is the same for each indicator.

9. Indicator paper according to claim 7 wherein the first colors of said indicators include a plurality of different colors, all of which are in said first portion of the spectrum.

References Cited in the file of this patent

UNITED STATES PATENTS

| | | |
|---|---|---|
| 2,167,304 | Klotz | July 25, 1939 |
| 2,249,867 | Snelling | July 22, 1941 |
| 2,464,155 | Russell et al. | Mar. 8, 1949 |
| 2,643,230 | Mooradian et al. | June 23, 1953 |
| 2,738,257 | Darby | Mar. 13, 1956 |
| 3,006,736 | Jordan | Oct. 31, 1961 |
| 3,011,874 | Deutsch | Dec. 5, 1961 |